(12) United States Patent
Kallenberger et al.

(10) Patent No.: US 10,989,206 B1
(45) Date of Patent: Apr. 27, 2021

(54) CONTROL SYSTEM HUB FOR BLOWER CONTROLS

(71) Applicants: Jeffery F. Kallenberger, Springfield, MO (US); James L. E. Meats, Springfield, MO (US); William S. Hohulin, Springfield, MO (US); Robert A. Valbracht, Springfield, MO (US); Rickey W. Jennings, Sparta, MO (US)

(72) Inventors: Jeffery F. Kallenberger, Springfield, MO (US); James L. E. Meats, Springfield, MO (US); William S. Hohulin, Springfield, MO (US); Robert A. Valbracht, Springfield, MO (US); Rickey W. Jennings, Sparta, MO (US)

(73) Assignee: Loren Cook Company, Springfield, MO (US)

( * ) Notice: Subject to any disclaimer, the term of this patent is extended or adjusted under 35 U.S.C. 154(b) by 295 days.

(21) Appl. No.: 15/865,839

(22) Filed: Jan. 9, 2018

Related U.S. Application Data

(60) Provisional application No. 62/445,918, filed on Jan. 13, 2017.

(51) Int. Cl.

| | |
|---|---|
| *F04D 25/06* | (2006.01) |
| *F04D 27/00* | (2006.01) |
| *F04D 29/40* | (2006.01) |
| *H02K 11/04* | (2016.01) |
| *F04D 25/08* | (2006.01) |
| *F04D 25/02* | (2006.01) |

(52) U.S. Cl.
CPC ......... *F04D 25/068* (2013.01); *F04D 25/02* (2013.01); *F04D 25/0693* (2013.01); *F04D 25/08* (2013.01); *F04D 27/004* (2013.01); *F04D 29/403* (2013.01); *H02K 11/044* (2013.01)

(58) Field of Classification Search
CPC ...... F04D 25/068; F04D 29/403; F04D 25/08; H02K 11/044
See application file for complete search history.

(56) References Cited

U.S. PATENT DOCUMENTS 3,541,416 A * 11/1970 Woyton ................. H02P 7/293
388/819
4,494,055 A * 1/1985 Bitting ...................... H02P 6/30
318/400.09
5,586,861 A * 12/1996 Berger .................... F04D 27/00
415/118

(Continued)

*Primary Examiner* — Bryan M Lettman
*Assistant Examiner* — Timothy P Solak
(74) *Attorney, Agent, or Firm* — Jonathan A. Bay

(57) ABSTRACT

A fan control system has a fan duct, a fan mounted in the duct, an electronic commutator (EC) motor for driving the fan, and a control system hub for controlling the EC motor. A pressure differential sensing system is mounted in association with duct and feeding a pressure differential signal to the control system hub. An input device mounted on the control system hub for scaling an output signal from a low percent extreme to a high percent extreme and sends that output signal to the EC motor. Wherein the control system hub speeds, slows or switches OFF the EC motor according to the pressure differential signal except that the input device sets a speed limit ceiling on the EC motor.

7 Claims, 7 Drawing Sheets
(4 of 7 Drawing Sheet(s) Filed in Color)

(56) References Cited

U.S. PATENT DOCUMENTS

| | | | |
|---|---|---|---|
| 2007/0202717 A1* | 8/2007 | Vera | B60R 16/0238 439/76.2 |
| 2011/0014061 A1* | 1/2011 | Hopkins | F04D 25/166 417/3 |
| 2011/0311943 A1* | 12/2011 | Gagliano | A61C 17/20 433/101 |
| 2013/0043895 A1* | 2/2013 | Zhan | F04D 27/004 324/750.01 |
| 2014/0139342 A1* | 5/2014 | Brown | G08B 21/12 340/603 |
| 2014/0339316 A1* | 11/2014 | Barooah | G06Q 50/06 236/49.3 |
| 2015/0048775 A1* | 2/2015 | Yeh | H02P 25/00 318/806 |

* cited by examiner

CONTROL SYSTEM HUB FOR BLOWER CONTROLS

CROSS-REFERENCE TO PROVISIONAL APPLICATION(S)

This application claims the benefit of U.S. Provisional Application No. 62/445,918, filed Jan. 13, 2017. The foregoing patent disclosure is incorporated herein by this reference thereto.

BACKGROUND AND SUMMARY OF THE INVENTION

The invention relates to air-moving control systems and, more particularly, to a control system hub for blower controls.

FIG. 7 allows a brief discussion of the prior art. FIG. 7 shows a conventional blower controller 110 in accordance with the prior art. The controller 110 might be set to run the fan motor 112 to maintain a pressure on pressure differential sensor 114 (eg., a Pitot tube in the air duct and another pressure tap outside the air duct) at a given setting, say, 0.2 inches of water. The fan motor 112 is an electronic commutator motor, which in brief means, that it has a built-in speed controller (not shown). The power for the motor 112 that turns the fan rotor (or blades) is supplied by public utility power feed 120 (typically anywhere from 120 VAC and/or 240 VAC as well as 480 VAC).

The power for not only (A) the built-in controller in the motor 112 (not shown) but also (B) the prior art controller comes from a 24 VDC feed. The conventional way according to the prior art to install such a blower system is that some responsible worker would have to wire supply electric line power from source 120 to the prior art controller 110 with an intermediate transformer 125 therebetween.

The problems started with the blower system being shipped to the job site. There would typically be two different contractors jointly responsible for the installation of the blower system. One would be mechanical, and the other electrical. But applicant has learned from experience that there can often times be remarkably poor coordination between the two contractors. For example, there would be no agreement as to which contractor would uncrate the new blower system, and be responsible for taking inventory of the parts and reviewing the instructions.

To applicant's surprise, applicant's wiring diagrams apparently confused the unfamiliar. Parties completing the wiring would frequently contact applicant for help. They would send applicant cell phone pictures of a tangle of wires all wire-nutted together which, given the grainy or false-color quality of the pictures in sometimes poorly lit environments, would even be a struggle for applicant to diagnose.

In summary, the wiring of the controls for the blower systems were an ongoing help-line response issue for applicant. Applicant was pleased to help out but it seemed also applicant could simplify some issues for the installers. The way how the wiring had been done as described above came about because . . . no one can remember. It's just the way it had always been done.

Ship the customer a blower controlled by a controller 110, and include a transformer 125 to step down to 24 VDC power voltage for the controller 110 from the power feed of supply source 120 (which can be any numerous AC voltages, and plural phases, eg., 220 VAC 3-phase, and so on).

It is an object of the invention to overcome the shortcomings of the prior art.

A number of additional features and objects will be apparent in connection with the following discussion of the drawings and preferred embodiment(s) and example(s).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
FIG. 1 is a color pictorial view of a control system hub in accordance with the invention for blower controls.

The figures show a control system hub 200 in accordance with the invention, as well as not only other prior art blower controls 110, including damper controls 130, but also the blower motor 112 and the public utility power feed 120.

The control system hub 200 includes the correct transformer 125 required to match the input infeed public utility power line supply 120 to the typical 24 VDC electric line power requirement for powering controllers (eg., the built-in controller for motor 112, the prior art controller 110, and the inventive control hub 200).

The transformer also provides the 10 VDC signal which is the information signal to the controllers. In general, the range of 0 to 10 VDC information signal to the EC motor 112 corresponds to 0% to 100% (ie., 0 to 100 percent) of the motor 112's highest rated speed. In practice, it turns out that about 2 VDC to 10 VDC turns the motor 112 at about between 20% and 100% of its highest rated speed.

Presumptively, control system hub 200 will be pre-attached to a housing of a blower fan, which means, this might all be in a closet inside a facility that is somewhat remote from workers responsible for adjusting its settings.

Given the foregoing, the hub 200 has a selector switch 3 (see FIG. 4) for selecting an operation mode, and a rheostat 8 (see FIG. 4) for selecting a speed for the motor 112 (see FIG. 4) between a range of about 20% to 100%.

The selector switch 3 (see FIG. 4) has four settings.

1—"Hand" mode, which means manual mode, which more particularly means that the percentage of speed for motor 112 dialed in on the rheostat 8 (see FIG. 4) absolutely controls.

2—"Off," which means what it says.

3—"Auto" mode, which more means that the percentage of speed for motor 112 (see FIG. 7) controlled by prior art controller 110 (see FIG. 7) absolutely controls.

Figure 7:
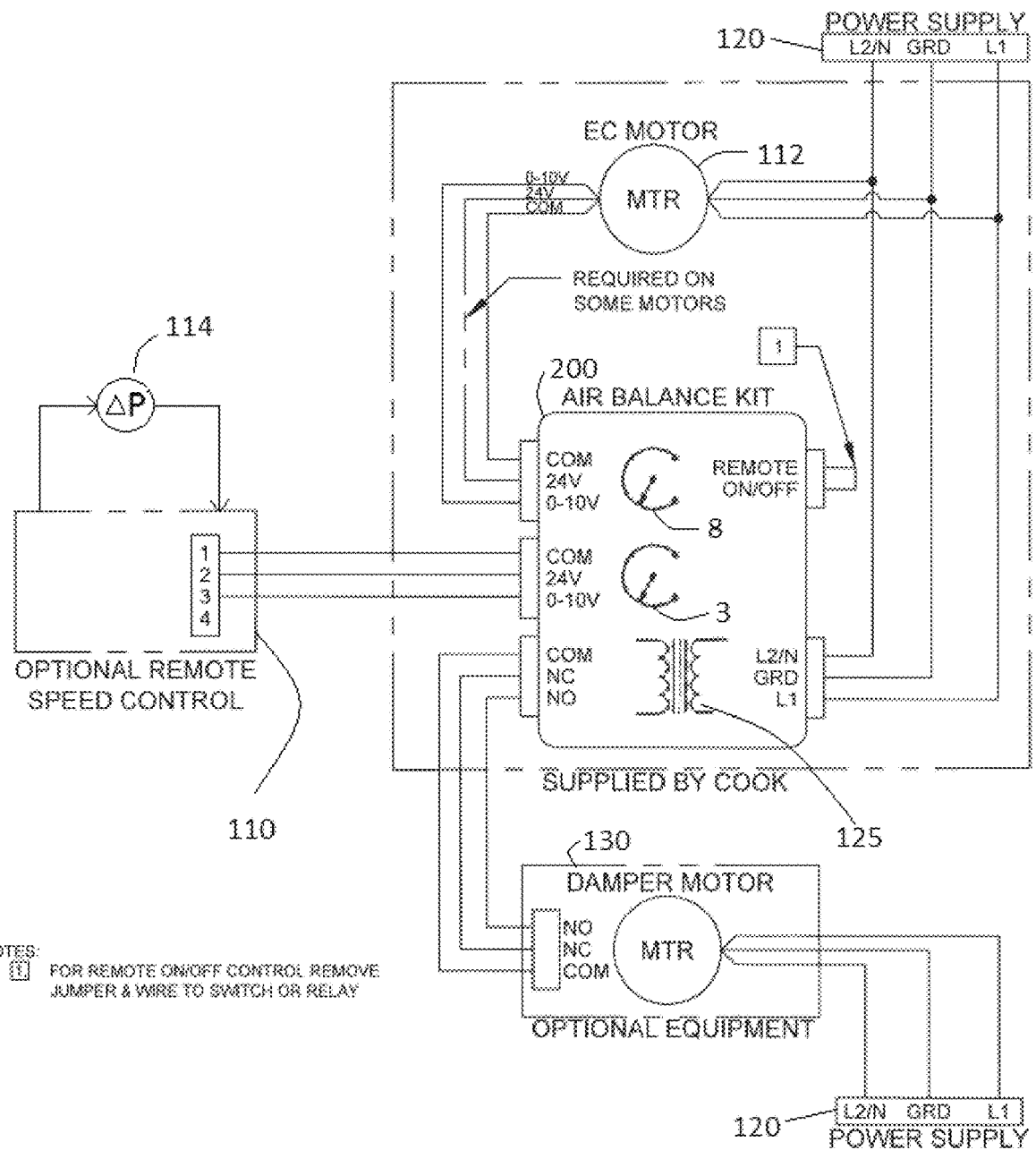
FIG. 7 is a block diagram, partly schematic, of the a control system hub in accordance with the invention, as well as not only other prior art blower controls, including damper controls, but also the blower motor and the public utility power feed.

4—"Auto Scaled" mode, which coordinates rheostat 8 (see FIG. 4) with prior art controller 110 (see FIG. 7). Neither absolutely controls. Instead, one can trump the other. This is easily explained by an example. Assume the rheostat 8 (see FIG. 4) of inventive hub control 200 is set to 80% speed (eg., 8 VDC) for blower motor 112 (see FIG. 7). Let's also assume the conventional prior art speed controller 110 (see FIG. 7) is set for 0.2 inches of water pressure differential for pressure differential device 114 (see FIG. 7). The "Auto Scaled" mode works this way. The control setting on rheostat 8 (see FIG. 4) is a ceiling for the operations of the prior art speed controller 110 (see FIG. 7). The prior art speed controller (see FIG. 7) can send control signals to move the speed of the motor 112 (see FIG. 7) between 20% and 80%. But at signals for greater than 80%, the rheostat 8 (see FIG. 4) imposes a speed limit on motor 112 (see FIG. 7).

This is the opposite of how cruise control works on automobiles. That is, cruise control imposes a floor on car speed. A drive can step on the gas pedal, and get the car to travel faster than the set speed. But as soon as the driver lets off on the gas pedal, the car speed will settle back down to the set speed. (This simple description ignores car speed failing to meeting the set speed when climbing hills or the like). The only way the driver can slow the car slower than the set speed is, to turn off the cruise control.

Applicant's "Auto Scaled" mode is more like the speed control for wakeboard and wake surfing boats (eg., "PERFECT PASS" of Nova Scotia, Canada). The selected speed is a ceiling. The driver can drive the boat at any speed below the ceiling, but as soon as the throttle is given enough thrust to drive the boat faster than a set speed, there is an override which keeps the boat the set speed, but not any faster. And therefor this is more comparable to how applicant's "Auto Scaled" mode balances the inputs between the auxiliary controller 110 (which very well may be prior art) and the inventive dialed-in setting on dial or adjuster 8 (see FIG. 4) for the control system hub 200 in accordance with the invention.

Figure 4:
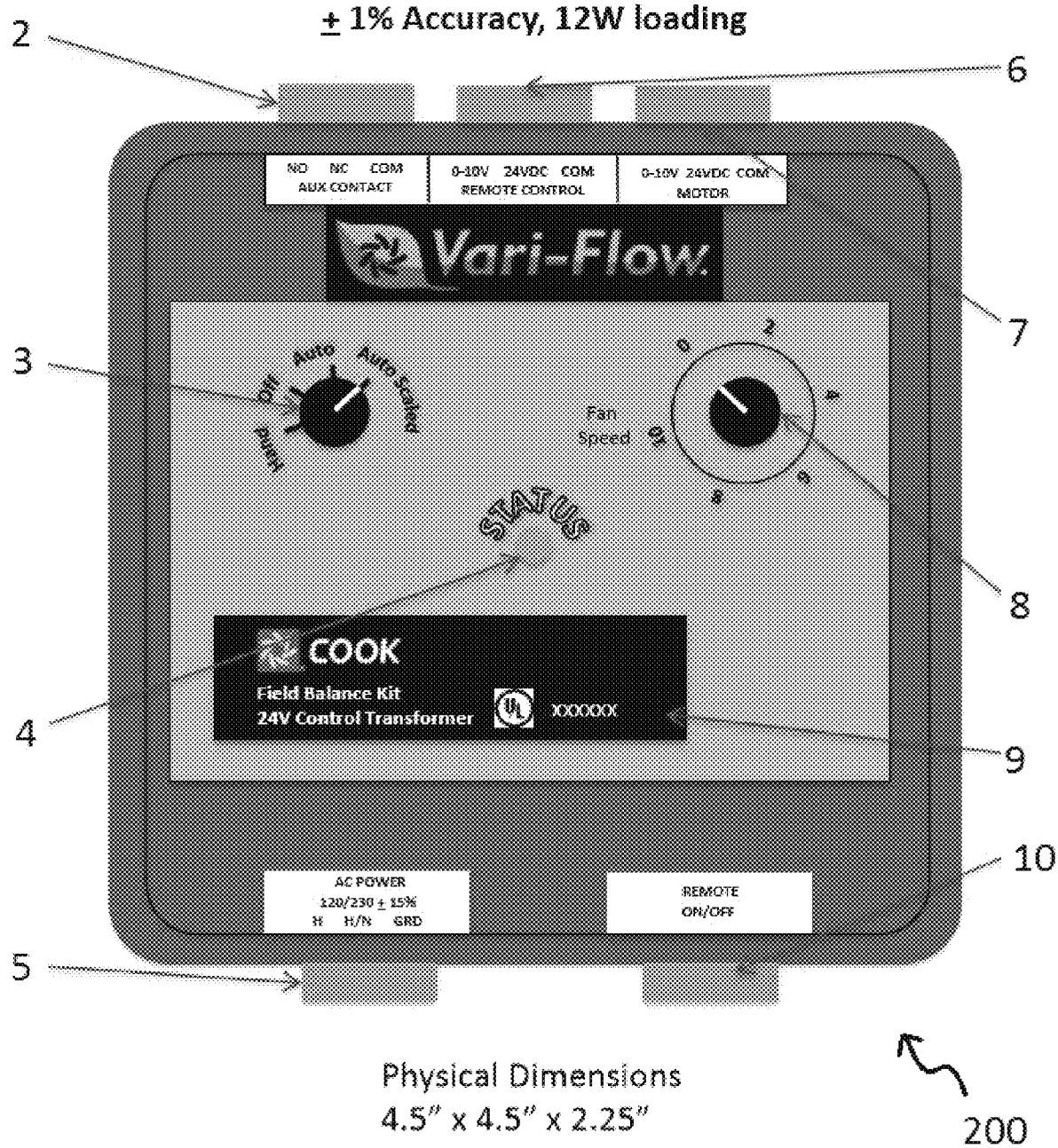
FIG. 4 is a front elevational color image corresponding to the front elevational black-line drawing of FIG. 2.
Figure 5:
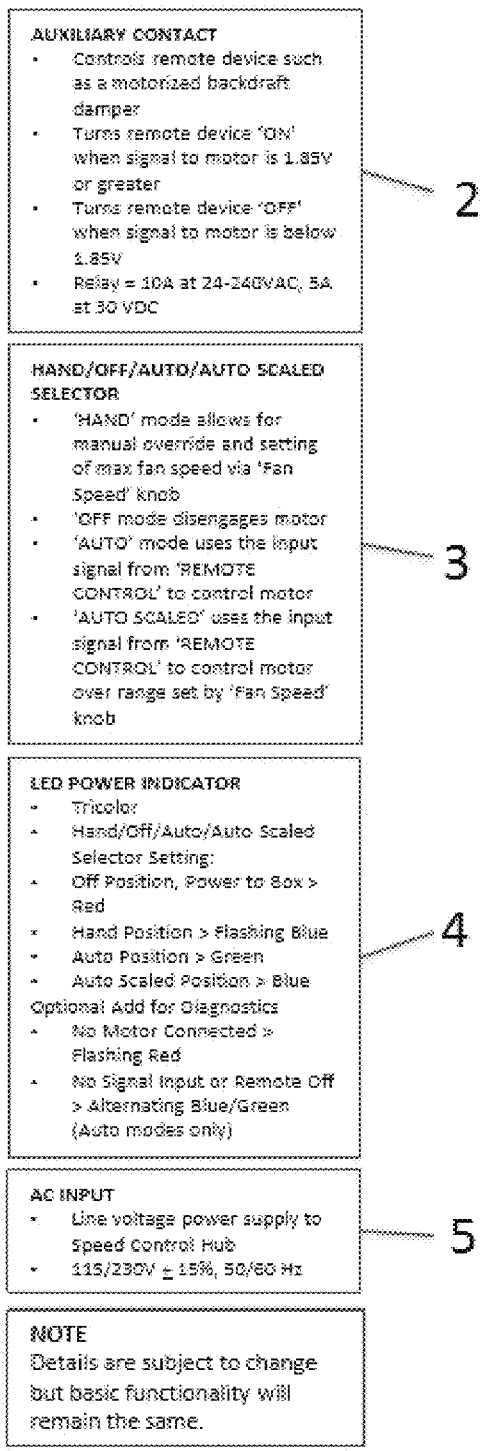
FIG. 5 is a block diagram showing the corresponding notes 2 through 5 that are called out in the left margin of FIG. 4.
Figure 6:
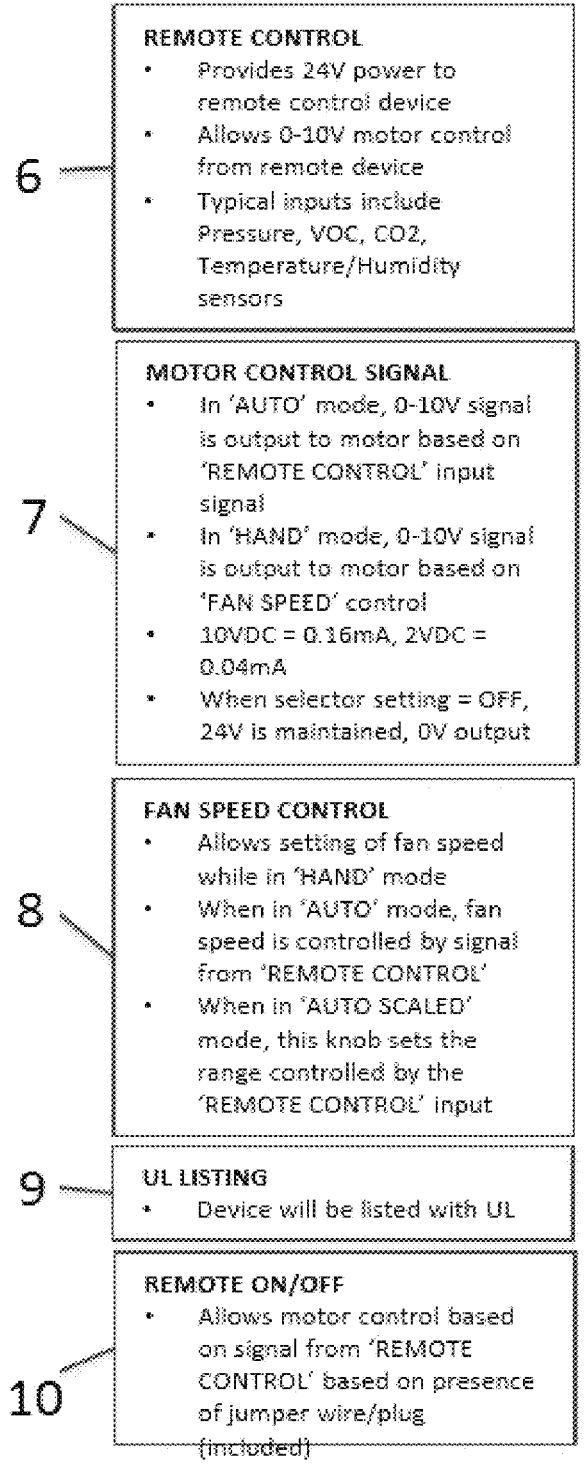
FIG. 6 is a block diagram showing the corresponding notes 6 through 10 that are called out in the right margin of FIG. 4.

It will be recalled that the "Brief Description of the Drawings" section above recites the following figure descriptions for FIGS. 4, 5 and 6.

Figure 2:
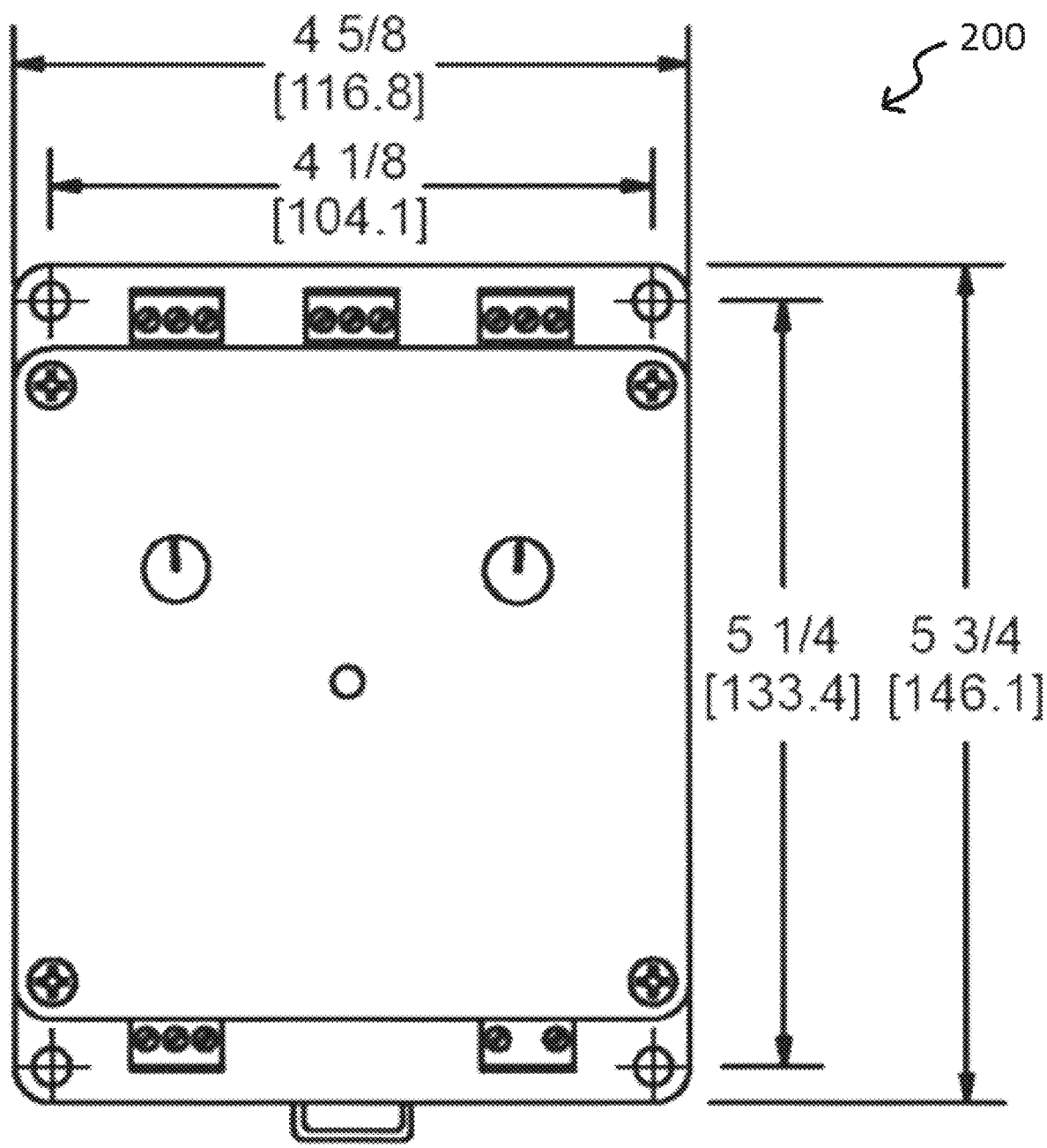
FIG. 2 is a front elevational black-line drawing thereof.
Figure 3:
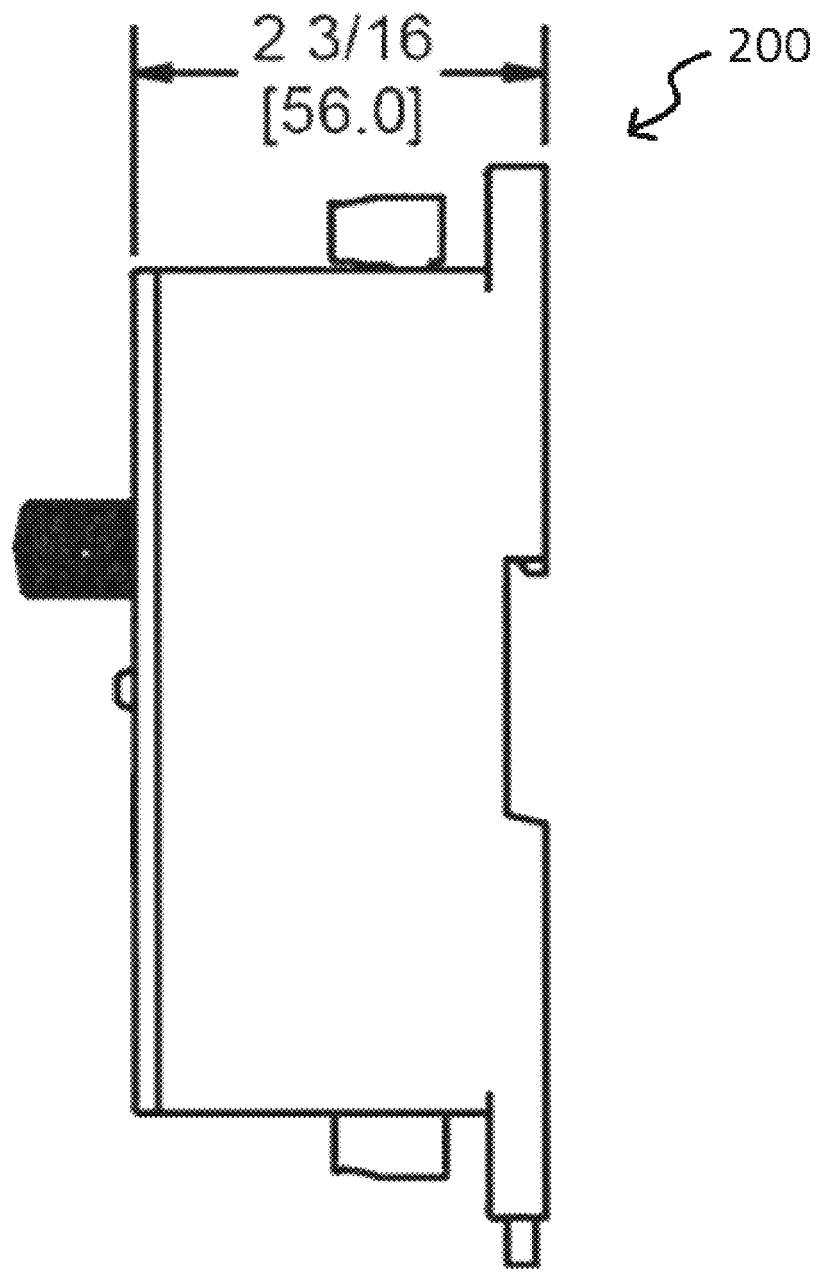
FIG. 3 is a side elevational black-line drawing of FIG. 2.

FIG. 4 is a front elevational color image corresponding to the front elevational black-line drawing of FIG. 2.

FIG. 5 is a block diagram showing the corresponding notes 2 through 5 that are called out in the left margin of FIG. 4.

FIG. 6 is a block diagram showing the corresponding notes 6 through 10 that are called out in the right margin of FIG. 4.

More particularly, the images and line drawings of control system hub 200 in accordance with the invention can be combined with remarks in the block diagrams to provide the following information.

AUXILIARY CONTACT terminals 2 include an NO (normally open) terminal, an NC (normally closed) terminal and a COM (common) terminal, which:

Controls remote device such as a motorized backdraft damper;
Turns remote device 'ON' when signal to motor is 1.85V or greater;
Turns remote device 'Off' when signal to motor is below 1.85V; and
Relay=10 A at 24-240 VAC, 5 A at 30 VDC.

SELECTOR SWITCH 3 has four mode positions labeled HAND, OFF, AUTO and AUTO SCALED, wherein:
'HAND' mode allows for manual override and setting of max fan speed via 'Fan Speed' knob;
'OFF mode disengages motor;
'AUTO' mode uses the input signal from 'REMOTE CONTROL' to control motor; and
'AUTO SCALED' uses the input signal from 'REMOTE CONTROL' to control motor over range set by 'Fan Speed' knob.

LED POWER INDICATOR 4 has the following attributes and/or provides the following signals and/or indications:
Tricolor;
Hand/Off/Auto/Auto Scaled Selector Setting;
Off Position, Power to Box>Red;
Hand Position>Flashing Blue;
Auto Position>Green;
Auto Scaled Position>Blue;
Optional Add for Diagnostics:
No Motor connected>Flashing Red; and
No signal Input or Remote Off>Alternating Blue/Green (Auto modes only).

AC POWER terminals 5 providing 120/230V±15%, and including an H terminal, an H/N terminal and a GRD terminal, which is:
Line voltage power supply to speed control Hub;
115/230V±15%, 50/60 HZ.

REMOTE CONTROL terminals 6 include a 0-10V terminal, a 24 VDC terminal and a COM terminal, which:
Provides 24V power to remote control device;
Allows 0-10V motor control from remote device;
Typical inputs include Pressure, VOC, CO2, Temperature and/or Humidity sensors.

MOTOR CONTROL SIGNAL terminals 7 include 0-10V terminal, a 24 VDC terminal and a COM terminal, wherein:
In 'AUTO' mode, 0-10V signal is output to motor based on 'REMOTE CONTROL' input signal;
In 'HAND' mode, 0-10V signal is output to motor based on 'FAN SPEED' control;
10 VDC=0.16 mA, 2 VDC=0.04 mA; and
When selector setting=OFF, 24V is maintained, 0V output.

FAN SPEED CONTROL rheostat 8 is labeled with the following indicia around an imaginary clock dial, namely "0, 2, 4, 6, 8 and 10," which:
Allows setting of fan speed while in 'HAND' mode;
When in 'AUTO' mode, fan speed is controlled by signal from 'REMOTE CONTROL;' and
When in 'AUTO SCALED' mode, this knob sets the range controlled by the 'REMOTE CONTROL' input.

UL LISTING indicia 9 indicates that the:
Device will be listed with UL.

REMOTE ON/OFF terminals 10:
Allows motor control based on signal from 'REMOTE CONTROL' based on presence of jumper wire/plug (included);
Wherein FIG. 7 further recites, for remote ON/OFF control, remove jumper 1, and wire to switch or relay.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A fan control wiring hub and control system for a fan driven by an electric motor powered by a public utility alternating current supply voltage at a specified nominal AC voltage, a specified phase and a specified frequency of any numerous AC voltages, any of a plurality of phases and any of a plurality of frequencies; said fan control wiring hub and control system comprising:
a set of AC POWER terminals (5) for infeed of the public utility alternating current supply voltage at the specified nominal AC voltage, the specified phase and the specified frequency and thereby power said fan control wiring hub and control system;
a housing;
circuits mounted within the housing for changing the specified nominal AC voltage, the specified phase and the specified frequency to a first direct current line voltage and a second direct current line voltage;
a set of MOTOR CONTROL SIGNAL terminals (7) and including a terminal for carrying run motor control signals varying between zero volts and the second direct current line voltage, a first direct current line voltage terminal and a COM (common) terminal whereby enabling wire connections to send first direct current line voltage power as well as send the run motor control signals to a controller built into the electric motor;
a set of REMOTE CONTROL terminals (6) mounted on the housing and including a terminal for carrying overridable motor control signals varying between zero volts and the second direct current line voltage a first direct current line voltage terminal and a COM (common) terminal to send the first direct current line voltage and receive the overridable motor control signals to and from a remote control device; and
a FAN SPEED CONTROL input device (8) mounted on the housing and circuits therefor allowing a user to set an upper speed limit level of a highest rated speed of the electric motor to a level of less than one-hundred percent (100%) and thereby overriding the remote control device;
wherein the fan control wiring hub and control system further comprises:
a SELECTOR manual input device (3) mounted on the housing providing the user a selection among at least four modes, and circuits therefor enabling the functions of the at least four modes;
said modes comprising:
a first mode corresponding to the motor turned OFF;
a second mode in which the remote control device is in control;
third mode in which the FAN SPEED CONTROL manual input device (8) and circuits therefor are in control; and
a fourth mode where the remote control device is in control up to the upper speed limit level set by the FAN SPEED CONTROL manual input device (8) and circuits therefor, which then overrides the remote control device.

2. The fan control wiring hub and control system of claim 1, wherein:
the FAN SPEED CONTROL input device (8) comprises a rheostat; and
the rheostat scales between extremes for scaling the output signal of the second direct current line voltage from between 0% and 100%.

3. The fan control wiring hub and control system of claim 1, wherein:
the FAN SPEED CONTROL manual input device (8) is manually controllable to set a ceiling on the upper speed limit level of the electric motor to at least between 20% of the electric motor's highest rated speed and 80%.

4. The fan control wiring hub and control system of claim 1, further comprising:
a remote control device operable on the first direct current line voltage and sending control line voltages corresponding to the second direct current line voltage detecting any of pressure differential, VOC, CO2, temperature and/or humidity inside a flow duct or environment.

5. The fan control wiring hub and control system of claim 1, further comprising:
a set of AUXILIARY CONTACT terminals (2) mounted on the housing and include an NO (normally open) terminal, an NC (normally closed) terminal and a COM (common) terminal whereby enabling wire connections to a remote auxiliary device.

6. The fan control wiring hub and control system of claim 5, further comprising:
circuits turning the remote auxiliary device ON or OFF dependent on a threshold of a percentage of the second line direct current voltage sent to the electric motor.

7. The fan control wiring hub and control system of claim 1, further comprising:
a set of REMOTE ON/OFF terminals (10) whereby enabling wire connections to a remote ON/OFF switch or relay.

* * * * *